United States Patent [19]
Raatz et al.

[11] Patent Number: 4,909,924
[45] Date of Patent: Mar. 20, 1990

[54] DECATIONIZED, DEALUMINATED AND STABILIZED L ZEOLITE AND USE THEREOF

[75] Inventors: Francis Raatz, Rueil Malmaison; Laurent Petit, Les Mureaux; Christian Marcilly, Houilles; Jean-Paul Bournonville, Cergy Pontoise; Christine Travers; Pierre Dufresne, both of Rueil Malmaison, all of France

[73] Assignee: Institut Francais du Petrole, Rueil-Malmaison, France

[21] Appl. No.: 84,726

[22] Filed: Aug. 13, 1987

[30] Foreign Application Priority Data

| Aug. 13, 1986 | [FR] | France | 86 11796 |
| Oct. 24, 1986 | [FR] | France | 86 14950 |
| Nov. 3, 1986 | [FR] | France | 86 15377 |
| Mar. 3, 1987 | [FR] | France | 87 02969 |

[51] Int. Cl.$^4$ .................. C10G 47/02; B01J 29/30
[52] U.S. Cl. ........................ 208/111; 502/66
[58] Field of Search .................... 502/66; 208/111

[56] References Cited

U.S. PATENT DOCUMENTS

| 3,794,600 | 2/1974 | Schutt | 252/455 Z |
| 4,539,304 | 9/1985 | Field | 502/66 |

FOREIGN PATENT DOCUMENTS

| 2812941 | 10/1978 | Fed. Rep. of Germany | 208/111 |
| 1286690 | 1/1962 | France . | |
| 1162969 | 9/1969 | United Kingdom | 208/111 |
| 2114594 | 8/1983 | United Kingdom | 208/111 |

Primary Examiner—Carl F. Dees
Attorney, Agent, or Firm—Millen, White & Zelano

[57] ABSTRACT

The present invention concerns a new decationized, dealuminated and stabilized zeolite of L type, characterized particularly by:

a total $SiO_2/Al_2O_3$ molar ratio of at least 8, a potassium content lower than 2.9% by weight, parameters $\vec{a}$ and $\vec{c}$ of the elementary mesh respectively lower than 1.836 nm and 0.754 nm, a nitrogen adsorption capacity at 77 K, for a partial pressure P/Ps of 0.19, higher than 11% by weight, a benzene adsorption capacity at 30° C., for a partial pressure P/Ps of 0.25, higher than 8.5% by weight, and a lattice of mesopores whose radii, measured by nitrogen adsorption-desorption at 77 K according to the BJH method, range from 0.8 nm to 20 nm.

10 Claims, No Drawings

DECATIONIZED, DEALUMINATED AND STABILIZED L ZEOLITE AND USE THEREOF

The present invention relates to a new stabilized, decationized and dealuminated zeolite and to its preparation from a L zeolit of $SiO_2/Al_2O_3$ molar ratio generally ranging from 5 to 7 or from 5.2 to 6.9, which may contain for example 13.8–16.5% by weight of potassium and, optionally, up to 10% by weight of sodium.

Generally, the starting zeolite may consist of a L zeolite of $SiO_2/Al_2O_3$ molar ratio generally ranging from 5 to 7, whose $K^+/(K^+ + Na^+)$ molar ratio usually ranges from 1 to 0.3 and whose crystalline parameters a and c are respectively of $1.84 \pm 0.004$ and $0.752 \pm 0.003$ nm.

The stabilized, dealuminated L zeolite of reduced content of alkali cations according to the present invention has a total $SiO_2/Al_2O_3$ molar ratio of at least 8 and preferably at least 12 (this ratio may even be very high, if necessary, and may exceed for example a value of 100); its potassium content is lower than 2.9% by weight and preferably lower than 0.7% by weight and, if necessary, lower than 0.1% by weight; its sodium content is lower than 0.5% by weight. The stabilized, dealuminated solid of reduced content of alkali cations ($K^+$, $Na^+$) still has a X-ray diffraction diagram characteristic of L zeolit with crystalline parameters a and c respectively lower than 1.836 nm and 0.754 nm, preferably lower than 1.815 nm and 0.752 nm respectively.

The nitrogen adsorption capacity of the stabilized, dealuminated and decationized solid of the present invention, measured at 77 K under a partial pressure P/Ps of 0.19, is higher than 11% by weight and preferably higher than 14% by weight. Its benzene adsorption capacity, determined at 30° C. under a partial pressure P/Ps of 0.25, is higher than 8.5% by weight and preferably higher than 11% by weight. The solid obtained according to the invention has a lattice of secondary pores (mesopores) whose radii, measured by nitrogen adsorption-desorption according to BJH method at 77 K, range from 0.8 nm to 20 nm or from 1.5 to 20 nm, more specifically from 1.5 nm to 6.0 nm. The volume of the secondary pores amounts to 5–70% of the total pore volume, the remaining pore volume being formed in major part of the structural micropores of the zeolite (radius lower than 1 nm).

Generally the crystallinity rate DX of the L zeolite according to the invention is higher than 60%, preferably higher than 80%.

BACKGROUND OF THE INVENTION

The procedure for preparing the above-described new zeolite material is based on the combined use of ion exchanges with ammonium cations (or optionally protons), of thermal treatments in the optional presence of steam and of acid etchings. These various treatments, which can be considered as unitary steps, have already been used in the prior art for decationizing, dealuminating and stabilizing zeolites synthesized with low $SiO_2/Al_2O_3$ ratios, as Y zeolite (U.S. Pat. Nos. 3,595,611, 3,966,882), offretite (French patent No. 2 569 678) and omega zeolite (French patent No. 2 583 654). However, the state of the art shows that the above-mentioned treatments were never used successfully to prepare a decationized, dealuminated and stabilized L zeolite conforming with the present invention. More precisely, to the extent of our knowledge, such a solid was not possible to prepare by any method whatsoever. As a matter of fact, L zeolite is a structure considered as very unstable both thermally and with respect to the acid treatments. As shown hereinafter, most of the authors agree to conclude that even a partial removal of the potassium cations initially contained therein results, irreparably, in a very severe degradation or even in a destruction of the crystalline frame during the conventional stabilizing treatments (roasting under steam for example). The decationizing, dealuminating and stabilizing treatments according to the invention, when used in adequate manner, give a zeolite of L structure, of reduced or, if necessary, very reduced content of alkalis (potassium and sodium), dealuminated and thermally very stable. In addition to the considerable improvement of the thermal stability of the solid, the treatments described according to the invention lead, through removal of alkali cations and control of the $SiO_2/Al_2O_3$ ratio, to L zeolites whose acid properties are clearly much higher than those of the starting zeolite and than those of L zeolites modified according to the prior art procedures. Solids of L structure of the present invention are suitable as catalysts or catalyst carriers for use in reactions involving an acid mechanism, such for example as cracking, hydrocracking or hydroisomerization of oil cuts.

L zeolite is a synthetic zeolite, without any known natural equivalent, which was discovered in 1958 (U.S. Pat. Nos. 2,711,565, 3,216,789). It is synthesized in the presence of potassium cations and optionally of sodium cations. The chemical composition of L zeolite in hydrated form ( R. BARRER and H. VILLIGER, Z. KRISTALLOGR, Bd 128, 3–6, p. 352) is typically: $(K_{0.91}Na_{0.08})_2Al_2O_3 \, 6.05 \, SiO_2$.

The $SiO_2/Al_2O_3$ molar ratio is generally liable to vary within the range of 5.2 to 6.9 and the molar (K/K+Na) in the range from 0.3 to 1.0 (U.S. Pat. Nos. 2,711,565, 3,216,789). Most of the L zeolites which have been the object of surveys published in the scientific literature, have a $SiO_2/Al_2O_3$ molar ratio very close to 6 and have potassium as cation in a highly major proportion. The crystallographic structure of L zeolite has been determined in 1969 (R. BARRER and H. VILLIGER, Z. KRISTALLOGR, Bd 128, 3–6, p. 352). It crystallizes in hexagonal system with the following mesh parameters:

$$a = 1.84 \pm 0.004 \text{ nm} \quad c = 0.752 \pm 0.003 \text{ nm}.$$

The crystalline frame is composed of cancrinite cages and hexagonal prisms arrangements which provide in the structure a lattice of unidimensional channels, parallel to c axis, having a twelve oxygen atoms opening and whose diameter is close to 0.71 nm (R. BARRER and H. VILLIGER, Z. KRISTALLOGR, Bd 128, 3–6, p. 352). By its pore size, L zeolite is classified in the category of Y zeolites. L zeolite comprise four types of cation sites (R. BARRER and H. VILLIGER, Z. KRISTALLOGR, Bd 128, 3–6, p. 352) of different accessibility. The moxt inaccessible sites are probably those located in the hexagonal prisms. The existence of such sites, not or hardly accessible, is very probably, as shown hereinafter, the reason of the impossibility to remove all the alkali cations from L zeolite by conventional techniques.

Although L zeolite appears, by its pore structure, as particularly attractive for catalysis, it has been the object of a limited number of surveys and of a still more limited number of applications. The most important application certainly concerns the use of non dealuminated and non decationized KL zeolite containing small particles of noble metal as metallic monofunctional catalyst in catalytic reforming (U.S. Pat. No. 4,104,320, EP No. 145 289, U.S. Pat. No. 4,443,326). The performance of catalysts of high L zeolite content have been investigated to a very small extent and with catalysts not previously subjected to dealumination or stabilization.

Very likely, the lack of interest for L zeolite in acid or acid-metallic bifunctional catalysis results from the checks met in the preparation of dealuminated, stabilized L zeolite of substantially decreased alkali, particularly potassium, cation content. As a matter of fact, it is known in the prior art that potassium cations are not completely removable by conventional ion exchanges (T. WEEKS and A. BOLTON, J. Phys. Chem. 79, (1975), 1924) and that the NH$_4$KL form is thermally very unstable (T. WEEKS and A. BOLTON, J. Phys. Chem. 79, (1975), 1924).

The conventional cation exchanges performed with ammonium salt solutions do not provide for the removal of more than about 80% of the potassium cations (T. WEEKS and A. BOLTON, J. Phys. Chem. 79, (1975), 1924).

It is assumed that the potassium cations located in the sites of difficult access, or inaccessible as the hexagonal prisms and the cancrinite cages, are those responsible for the limitations observed for the exchange rates.

The partial removal of K$^+$ cations may be achieved by treatments in acid medium of KL zeolite or of a L zeolite previously exchanged with NH$_4$+. When the treatment conditions are moderate (low acid concentration, low temperature) the crystalline structure of the zeolite is moderately affected but the exchange rates are then limited. A rather low potassium content of 1.56% by weight has been obtained by a direct acid treatment in 0.02 N HCL (N BURSIAN, Y. SHAVANDIN, V. NIKOLINA, L. KIRKACH and Z. DAVYDOVA, Zh. Prik. Khim, vol. 48, n° 3, (1975), 554). However, here L zeolite has very probably a very low SiO$_2$/Al$_2$O$_3$ ratio, of about 5; the potassium content of 1.56% by weight then corresponds to an exchange rate of 80–90%. More severe treatment conditions may provide for an increased exchange rate but then lead to a severe destruction of the crystalline structure and to an amorphization of the zeolite. On the other hand, direct treatments in acid solutions do not lead exclusively to a decationization but also to a dealumination of the solid. It is well known in the prior art that a direct dealumination, in solution, of zeolites of high aluminum content, results in the appearance of defects of the structure and in the destruction of the crystalline structure. It is thus not surprising that the decationization tests by direct treatment in acid medium of L zeolite, in imperfectly controlled conditions, were proved to be negative.

As concerns the thermal stability of NH$_4$KL zeolite, only solids containing high potassium amounts were surveyed (exchange rate generally lower than 80%). In this respect, the results given in the literature are conclusive: NH$_4$KL zeolites are thermally very unstable. Thus NH$_4$KL zeolites, exchanged at about 80%, treated with steam, have their crystallinity rate, as measured by X-ray diffraction, very strongly decreased even at a temperature of 550° C., the destruction being effective at 820° C. (M. RUSAK, I. URBANOVICH, N. KOZLOV, Izv. An. BSSR. Ser. Khim, 3. (1976) 37).

The same phenomenon is observed during roasting steps conducted under controlled conditions in the absence of steam, for highly exchanged (about 80%) NH$_4$KL forms: from 500° C., the crystallinity, measured by X-ray diffraction, is highly degraded (T. WEEKS, and A. BOLTON, J. Phys. Chem, 79, (1975), 1924). According to most of the authors, the unstability of L zeolite in NH$_4$KL form during thermal treatments increases with a decreasing potassium content, i.e. when the exchange rate increases (T. KEII, J. Chem. Soc. Farad. Trans 1, 72, (1976), 2150). According to these authors, the presence of a high potassium amount, particularly in the cancrinite cages, would be necessary to maintain at high temperature the cohesion of the crystalline lattice. It is possible to limit the destruction of highly exchanged NH$_4$KL forms during thermal treatments, by using thick beds (T. WEEKS and A. BOLTON, J. Phys. Chem. 79, (1975) 1924), however, the crystallinities, measured by DX of the solids obtained by this technique, are much lower than those of the initial solid.

U.S. Pat. No. 3,794,600 disclosing again a part of the process according to U.S. Pat. No. 3,375,065, claims a method for substantially completely removing potassium from L zeolite (K% <0.35% by weight) without affecting the crystallinity of the solids. This method consists of roasting NH$_4$KL zeolite at temperatures lower than 600° C. and performing exchanges in solutions of ammonium salts containing chromate ions. It is very important to note that in this document (U.S. Pat. No. 3,794,600) the crystallinity of the solids is not measured by X-ray diffraction but by benzene adsorption. Now, it has been proved (T. WEEKS and A. BOLTON, J. Phys. Chem. 79, (1975) 1924) that roasting of NH$_4$KL zeolite, exchanged at 80% (first step of U.S. Pat. No. 3,794,600), performed without particular care, leads to a severe degradation or even to a destruction of the DX crystallinity, whereas the adsorption capacity of the solid remains relatively very high. In these conditions, and inasmuch as the roasting conditions are not clearly defined in U.S. Pat. No. 3,794,600, it is very probably that the decationized solids obtained according to the procedures recommended in this document have a low DX crystallinity.

It thus appears that the present state of the art does not provide means for prepariing a decationized, dealuminated L zeolite of low mesh volume, stabilized and having a lattice of secondary pores. However, L zeolites having such characteristics are very useful since they make possible to prepare catalysts which are both active and selective in hydrocarbon conversion reactions.

SUMMARY OF THE INVENTION

Now, it has been found that, by judiciously using treatments in solutions (solutions of ionizable ammonium salts or acid solutions) and thermal treatments, these operations being conducted under controlled conditions, it is possible to prepare, from raw synthetic L zeolite (in KL or KNaL form), of SiO$_2$/Al$_2$O$_3$ molar ratio generally ranging from 5.2 to 6.9 (said ratio being optionally within a wider range), a well crystallized L zeolite as shown by X-ray diffraction and nitrogen adsorption, whose characteristics are those stated above.

CHARACTERIZATION OF DECATIONIZED, DEALUMINATED AND STABLIZED L ZEOLITES

Decationized L zeolite of high silica content, stabilized according to the present invention, has been characterized by the following techniques:

X-ray diffraction

The apparatus comprises: a PW 1130 PHILIPS generator (35 mA, 35 kV), a PW 1050 PHILIPS goniometer, a Cu tube (Fine Focus), a graphite rear monochromator, an automatic sample feeder.

For each sample were measured, from X-ray diffraction spectra, the bottom surface over a range of 10°–38° (2θ) and, within the same zone, the surface of the lines in number of pulses for a step-by-step recording of 2 seconds with steps of 0.02° (2θ). The percent of crystallized product is expressed by the ratio: surface of the lines/total surface. Then the ratios for each treated sample are compared with those of a reference standard of the same series as the sample and containing a similar potassium amount. For the solids treated with steam and dealuminated, the reference is generally the decationized but non dealuminated solid. Thus the crystallinity rate is expressed in percent with respect to a reference arbitrarily set at 100.

A good selection of the reference is important since an intensity enhancement or decrease of the lines may happen in relation with the cation content of the samples.

The crystalline parameters have been calculated by the least-square method from the formula (hexagonal mesh) given in "X-ray Diffraction Procedures" (JOHN WILEY Inc, N. Y. C.):

$$d = \frac{a}{\sqrt{\frac{4}{3}(h^2 + k^2 + hk) + \frac{L^2}{c^2}}}$$

Microporosity and mesoporosity

The secondary mesoporosity is determined by the BJH technique (BARRET, JOYNER, HALENDA, J. Am. Chem. Soc, 73, (1951), 373) based on digital processing of the isotherm of nitrogen desorption at 77 K. The total pore volume is taken at a nitrogen pressure such that $P/P_o=0.95$, P being the measured nitrogen pressure and Po the nitrogen saturating vapor pressure at the measurement temperature.

The volume of the secondary pores is measured by difference between the total pore volume taken at a nitrogen pressure such that $P/P_o=0.95$ and the micropore volume estimated from the amount of adsorbed nitrogen at $P/P_o=0.19$.

The amount of benzene adsorption is measured by gravimetry. The adsorption takes place at 30° C. under a partial benzene pressure of 25 Torr (3333 Pa).

Quantitative chemical analysis

The chemical composition of the solid samples is determined by conventional chemical analysis: X fluoescence and atomic absorption.

PREPARATION OF DECATIONIZED, DEALUMINATED AND STABILIZED L ZEOLITES

The starting L zeolite is obtained by synthesis (EP Nos. 142 347, 142 355 and U.S. Pat. No. 3,216,789 for example). It may contain up to 10% by weight of sodium and 13.8–16.5% by weight of potassium. The $K^+/(K^+ + Na^+)$ molar ratio is generally in the range from 1.0 to 0.3 and the $SiO_2/Al_2O_3$ molar ratio is usually from 5.2 to 6.9. The crystalline parameters a and c are respectively $1.84\pm0.004$ nm and $0.752\pm0.003$ nm.

The method for preparing decationized, dealuminated and stabilized L zeolites according to the invention is as follows:

First step

First of all, a large part of the alkali cations (i.e. in major part $K^+$) is removed by techniques known in the prior art. At this stage it is important to obtain an alkali content, more particularly a potassium content, lower than 6% by weight and preferably than 4 or even 3% by weight without affecting the crystallinity of the solid. This can be achieved by means of:

either at least one ion exchange at a temperature from 0° to 150° C. in a solution of ionizable ammonium salt (nitrate, sulfate, chloride, acetate etc . . .) of normality from 0.1 N to saturation and preferably from 4 to 12 N, for at least 20 mn, or at least one treatment between 0° and 150° C. in a solution of inorganic acid (HCl, $HNO_3$, $H_2SO_4$ etc . . .) or organic acid ($CH_3COOH$ etc . . .) of normality lower than 1 N and preferably 0.2 N, for at least 20 mn.

It is possible to obtain the required alkali cation contents by combining the treatments in solutions of ionizable ammonium salts with treatments in diluted acid solutions or still by performing the treatments in solutions containing both one or more ionizable ammonium salts and one or more acids, provided that the total acid normality be lower than 1 N and preferably 0.2 N.

Second step

The zeolite obtained after said first series of treatments is subjected to roasting in the presence or absence of steam. The preferred conditions are those providing for a quick removal of the decomposition products, essentially water and optionally ammonia. However, depending on the cation content of the solid and on the selected temperature, the roasting can be performed in the presence of a small amount of steam. The preferred operating conditions for this first roasting step are the following:

Roasting in air or inert gas containing less than 15%, preferably less than 1%, of steam with total flow rates from 0.5 to 100 $1h^{-1}g^{-1}$, preferably higher than 5 $1h^{-1}g^{-1}$. The rate of temperature increase depends on the gas flow rate: the lower the gas flow rate, the lower the rate of temperature increase. A rate of increase of about 5° C. $mn^{-1}$ will be preferred. The treatment temperature is lower than 800° C. and preferably ranges from 300° to 600° C., the most preferred range being 380°–480° C. The stage at the temperature of treatment lasts more than 20 mn, preferably more than 60 mn.

Third step

After said roasting step, the zeolite is subjected to at least one treatment in solutions of ionizable ammoniium salts or in acid solutions. The preferred conditions of treatment comprise the use of:

either a solution of a ionizable ammonium salt (nitrate, sulfate, chloride, acetate, etc . . .) of normality ranging from 0.1 N to saturation, preferably from 4 to 12 N, at a temperature in the range from 0° to 150° C., for a least 20 mn, or a solution of an inorganic acid (HCl, $H_2SO_4$, $HNO_3$ etc . . .) or organic acid ($CH_3COOH$ etc . . .) of normality lower than 10 N, preferably lower than 3 N, the temperature being from 0° to 150° C.

At the end of these various treatments, the potassium content of the solids is lower than 2.9% by weight and preferably lower than 0.7% by weight (the sodium content at this stage being generally lower than 0.5% by weight and the crystallinity being measured by X-ray diffraction or nitrogen adsorption).

Fourth step

The obtained well crystallized L zeolite of reduced alkali content is subjected to thermal treatment in the presence or absence of steam, the presence of steam being preferred. Two types of procedures can be used:

roasting in a gas (air or air-containing gas or inert gas), said gas preferably containing from 5 to 100% of steam, with total flow rates ranging for example from 0.01 to 100 $1h^{-1}g^{-1}$. The roasting temperature is preferably from 500° to 900° C., the treatment lasting more than 20 mn, preferably more than 60 mn.

roasting in confined atmosphere, i.e. without any external gas flow. Here, the steam necessary for the treatment is supplied by the product itself (self steaming). As precedingly, the treatment is conducted at a temperature from 500° to 900° C., over a period longer than 20 mn, preferably than 60 mn.

Fifth step

After the preceding thermal treatment, L zeolite is subjected to at least one etching in a solution of inorganic acid (HCl, $H_2SO_4$, $HNO_3$, etc . . .) or organic acid ($CH_3COOH$ etc . . .) at a temperature from 0° C. to 150° C. The normality of the acid solution ranges from 0.05 to 10 N, preferably from 0.5 to 5 N, the ratio of solution volume to the solid weight, expressed in $cm^3 g^{-1}$, is preferably from 2 to 20. The treatment time is longer than 20 mn. In order to avoid a possible degradation of the solid, it is important to optimize the strength of the acid etching in relation with the temperature of the last thermal treatment and with the steam content used for this treatment. Accordingly it is desirable to select, for a given acid, a concentration adapted to the conditions of the last thermal treatment (the lower the roasting temperature, the lower acid concentration) or still to first suspend zeolite in distilled water before adding the acid progressively. p In order to obtain a decationized, dealuminated solid keeping its crystallinity, measured both by X-ray diffraction and nitrogen adsorption, it is highly essential to correctly select the operating conditions of the above-described different treatments. In this respect, the roasting temperature of the second step, the presence or absence of steam during said step, as well as the rate of removal of the decomposition products, must be adapted to the alkali cation content obtained at the end of the step 1. Similarly, the maximum roasting temperature of step 4, as well as the steam content selected for this step, must be determined, not only in relation with the desired characteristics for the final product but also in relation with the alkali cation content of the solid at the end of step 3. Moreover, as precedingly emphasized, the severity of the acid etching of step 5 must be optimized in relatioin with the selected treatment conditions for steps 1, 2, 3 and 4. In order to obtain $SiO_2/Al_2O_3$ ratios of very high value, for example higher than 50, it may be necessary to perform several roasting-acid etching cycles, i.e. to repeat steps 4 and 5 several times. It is important to observe that, when the selected operating conditions for step 1 provide for a sufficient decrease of the alkali cation content, and more particularly of the potassium content of the solid (K% preferably lower than 3% by weight), steps 2 and 3 can be omitted, provided that the operating conditions of steps 4 and 5 be adapted accordingly.

The decationized, dealuminated and stabilized L zeolite whose preparation and characteristics have been described may be used as catalyst or part of catalyst (in admixture with a matrix) for hydrocarbon conversion by reactions of acid or acid-metallic bifunctional mechanism.

EXAMPLES

The following examples are given to illustrate the invention but must not be considered as limiting the scope thereof.

Examples 1 to 8, hereinafter, illustrate the qualities of the zeolite according to the invention.

The present invention also concerns a fluid catalytic cracking process for hydrocarbon charges in the presence of a catalyst containing decationized, dealuminated and stabilized L zeolite.

Cracking processes, wherein hydrocarbon molecules of high molecular weight and high boiling point are splitted into smaller molecules boiling at lower temperature ranges, are currently used in the oil industry.

For example, the most currently used process for this purpose is presently the so-called fluid catalytic cracking (in short FCC) process. In this type of process, the hydrocarbon charge is vaporized and contacted at high temperature with a solid cracking catalyst which is maintained in suspension in the vapors of the charge. When, by cracking, the desired range of molecular weight has been reached, with the corresponding decrease of the boiling points, the solid catalyst is separated from the obtained products, stripped, regenerated by combustion of the formed coke, and then again contacted with the charge to be cracked.

The charges to be cracked are usually introduced into the reaction zone at a temperature generally ranging from 80° to 400° C., under a relative pressure from 0.7 to 3.5 bar, whereas the temperature of the regenerated catalyst reaching said zone may be of about 600°–950° C.

The general conditions of catalytic cracking reactions are well-known and need not to be repeated here (see for example-U.S. Pat. Nos. 3,293,192, 3,449,070, 4,415,438, 3,518,051, 3,607,043).

Nowadays, the cracking catalysts are of the zeolite type.

The particular L zeolite according to the invention is particularly of high interest for this purpose.

The cracking catalyst used according to the present invention contains by weight:

(a) 30–95% of at least one matrix selected mainly from the group consisting of silica-aluminas, silica-magnesias and clays, optionally with an additional amount, into said matrix, of another solid selected from the group consisting of aluminas, silicas, zirconia, boron oxide, magnesia, titanium oxide or a combination of at least two of the preceding oxides.

(b) 5–70% of the above-defined L zeolite, said zeolite further containing optionally one or more metal elements currently used in cracking catalysts, particularly metals of the rare-earth family.

The catalyst used according to the invention may also advantageously contain minor amounts, for example lower than 1000 ppm, of rhenium or of a noble metal from the platinum family (platinum, palladium, iridium, osmium, rhodium, ruthenium) and/or another metal (e.g. 0.01–5%) particularly as oxide, such as manganese, iron, cobalt, chromium, etc . . .

Examples 9 and 10 relate more particularly to the catalytic cracking aspect.

The present invention also concerns a process for isomerizing paraffins in the presence of the catalyst containing a decationized, dealuminated and stabilized L zeolite.

The isomerization of normal paraffins of low molecular weight is highly important in the oil industry in view of the very high octane number of isoparaffins.

It is advantageous to convert $C_4$–$C_7$ and mainly $C_5$–$C_6$ n-paraffins to isoparaffins in order to obtain a motor-fuel of high octane number. By this process, the light gasoline fractions and particularly the straight-run top fractions may be improved.

The use of the new catalyst containing the particular L zeolite according to the invention is particularly interesting.

For the reactions of paraffin isomerization, the catalyst formed essentially of L zeolite according to the invention must further contain 0.1–5% of at least one noble metal of the platinum family.

The isomerization of paraffins will be illustrated in examples 11, 12 and 13.

Finally, the invention also concerns a process for hydrocracking oil cuts in the presence of a catalyst essentially formed of L zeolite according to the invention.

The hydrocracking of heavy oil cuts is particularly important in the refining industry in order to obtain, from heavy charges in excess which are difficult to upgrade, lighter fractions such as gasolines, jet-fuels and light gas-oils which are required to adapt the refinery production to the demand structure. The advantage of the catalytic hydrocracking, as compared with the catalyic cracking, is to provide middle distillates, jet fuels and gas-oils of very high grade. However, it has the disadvantage of producing a gasoline of much lower octane number than that obtained by catalytic cracking.

The catalysts used in the prior art for hydrocracking are all of bifunctional type, associating an acid function with a hydrogenating function. The acid function is brough by carriers having generally large surfaces (about 150–800 $m^2 \cdot g^{-1}$), having a surface acidity, such as halogenated (mainly chlorinated or fluorinated) aluminas, boron oxide and aluminum oxide combinations, amorphous silica-aluminas and zeolites. The hydrogenating function is brought either by one or more metals from group VIII of the periodic classification of elements such as nickel, palladium or platinum for example, or by an association of at least two metals selected from groups VI (mainly molybdenum and tungsten) and VIII (mainly cobalt and nickel) of the periodic classification of elements, at least two of the metals of said association pertaining to two different groups (VI and VIII).

The equilibrium between the two acid and hyrogenating functions is a fundamental parameter which determines the activity and the selectivity of the catalyst. A low acid function and a strong hydrogenating function give catalysts of low activity, operating at a generally high temperature (about 390° C. or more), and at a low space feeding velocity (the VVH, expressed in volume of treated charge per volume unit of catalyst and per hour is generally lower than 2), but having a very good selectivity to middle distillates.

Conversely, a strong acid function and a low hydrogenating function give catalysts which are very active but have a poor selectivity to middle distillates.

Other conventional catalytic hydrocracking catalysts comprise for example carriers of low acidity such as amorphous silica-aluminas, for example. Such systems are used to produce high-grade middle distillates or still, when their acidity is very low, oil bases.

Amorphous silica-aluminas form a family of carriers of low acidity. Many hydrocracking catalysts on the market are formed of silica-alumina associated either to a group VIII metal or preferably, when the content of heteroatomic poisons of the charge to be treated exceeds 0.5% by weight, to a combination of sulfides of metals from groups VI B and VIII. These systems have a good selectivity to middle distillates and the formed products are of high quality. The less acid of these catalysts may also produce lubricating bases. The disadvantage of all these catalytic systems with an amorphous carrier is, as above-mentioned, their low activity.

The acid zeolites have the advantage, with respect to other above-mentioned acid carriers, to bring a much higher acidity. The new catalysts containing them are thus much more active and, accordingly, can be operated at lower temperature and/or with a higher feed space velocity (VVH). However, this higher acidity changes the equilibrium between the two catalytic functions, acid and hydrogenating. It results a significant modification of the selectivity of these catalysts as compared with the conventional catalysts; they have a higher cracking activity and, accordingly, produce more gasoline than middle distillates.

It has been discovered, here, that is was advantageous to use, for hydrocracking, a type of zeolite catalysts containing:

(a) a L zeolite conforming to the invention whose physical characteristics and acidity have been specially modified, and (b) an amorphous matrix essentially formed of alumina or of a combination of oxides as hereinafter defined. This type of catalyst exhibits an activity and a selectivity to middle distillates significantly improved as compared with the other systems of the prior art based on zeolites.

More particularly, the invention concerns a catalyst containing by weight:

(a) about 20–98% (preferably 50–95%) of a matrix selected from the group consisting of at least alumina, silica, silica-alumina, aluminaboron oxide, magnesia, silica-magnesia, zirconia, titanium oxide, clay.

(b) 2–80% of a particular L zeolite as above-described, (c) at least one metal or compound of metal selected from the group consisting of noble or non noble metals from group VIII of the periodic classification of elements, the concentration of the one or more noble metals from group VIII, expressed as metal weight, ranging from 0.01 to 5% (preferably from 0.03 to 3%), the concentration of the one or more non noble metals from group VIII, expressed as metal weight, ranging from 0.01 to 15% (preferably 0.05–10%).

The above-described catalyst is particularly convenient for hydrocarbon hydrocracking reactions. A hydrocracking catalyst containing a zeolite as above-defined, tested with a hydrotreated vacuum residue or another hydrocracking conventional heavy charge is much more active and selective to middle distillates than a catalst containing a non modified L zeolite. Without prejudicing the reasons of said improvement as compared with a non modified zeolite, it can be assumed that the selected type of treatment has modified the nature and the strength of the catalyst acid function as well as the accessibility of the site to hydrocarbon heavy molecules, typically comprising 20-40 carbon atoms.

The zeolite whose characteristics comply with the above-defined criteria is dispersed into a generally amorphous matrix, essentially comprising alumina, silica, silica-alumina, alumina-boron oxide, magnesia, silica-magnesia, zirconia, titanium oxide or a combination of at least two of the preceding oxides, or still a clay or a combination of the preceding oxides with clay. Said matrix has essentially for purpose to facilitate the shaping of the zeolite as agglomerates, balls, extrudates, pellets, etc . . . , which can be used in an industrial reactor. The matrix proportion of the catalyst is about 20 to 98% by weight, preferably 50-95%.

The hydro-dehydrogenation component of the catalyst according to the present invention is for example a compound of a group VIII metal (mainly nickel, palladium or platinum), or a combination of at least two of the preceding compounds, or a combination of group VI (mainly molybdenum and/or tungsten) and group VIII non noble metal (mainly cobalt and/or nickel) compounds (mainly oxides).

As above-mentioned, the final catalyst must comprise from 2 to 80% by weight of specially modified L zeolite, preferably 3-50%. The metal compound concentrations, expressed as metal weight, are as follows: 0.01-5% by weight of group VIII metal, preferably 0.03-3% by weight, when only noble metals of palladium or platinum type are concerned, 0.01-15% by weight of group VIII metals, preferably 0.05-10% by weight, when non noble metals of group VIII, for example of nickel type, are concerned; when using both at least one metal or compound of metal from group VIII and at least one compound of group VI metal, it will be advisable to use about 5-40% by weight of a combination of at least one compound (mainly oxide) of a group VI metal (mainly molybdenum or tungsten) and at least one metal or compound of metal from group VIII (mainly cobalt or nickel) and preferably 12-30%, with a ratio by weight (expressed as metal oxides) of group VIII metals to group VI metals ranging from 0.05 to 0.8, preferably from 0.13 to 0.5.

The hydrogenating function, as precedingly defined (group VIII metals or association of oxides of groups VI and VIII metals) may be introduced into the catalyst at different steps of the preparation and in various manners.

It may be introduced only partly (for associations of groups VI and VIII metal oxides) or in totality during the mixing of the zeolite with the oxide gel selected as matrix. It may be introduced in one or more ion exchange operations onto the roasted carrier formed of the zeolite dispersed into the selected matrix, by means of solutions containing presursor salts of the selected metals when they pertain to group VIII. It may be introduced in one or more steps of impregnating the carrier, shaped and roasted, with a solution of precursors of group VIII metals (mainly Co and/or Ni) oxides when the precursors of the oxides of group VI (Mo and/or W) metals have been previously introduced when mixing the carrier. Finally, it can be introduced in one or more impregnation operations of the roasted carrier formed of zeolite and matrix, by means of solutions containing precursors of the oxides of groups VI and/or VIII metals, the precursors of oxides of group VIII metals being preferably introduced after those of group VI or together with the latter. The main precursor salts to be used are for example:

For groups VIII (cobalt or nickel): nitrate, acetate, sulfate of hydrated divalent cations or hexamine cations $Co(NH_3)_6^{2+}$ and $Ni(NH_3)_6^{2+}$.

For group VI (Mo and W): the various known ammonium molybdates or tungstates.

When the metal oxides are introduced in several impregnations with the corresponding precursor salts, an intermediary roasting step of the catalyst may be performed at a temperature from 250° to 600° C.

The molybdenum or tungsten impregnation may be facilitated by adding phosphoric acid in solutions of ammonium paramolybdate. It is also possible to effect the molybdenum-nickel impregnation in the presence of phoshoric acid.

The obtained catalysts are particularly convenient for the hydrocracking of heavy cuts, exhibit an improved activity as compared with the catalysts of the prior art, and have the further advantage of an improved selectivity for the production of middle distillates of high grade.

The charges treated by this process are straight-run on vacuum distillates, deasphalted or hydrotreated residues or equivalents. They consist at least of 80% by volume of compounds whose boiling points range from 350° to 580° C. They contain heteroatoms such as sulfur and nitrogen. The hydrocracking conditions such as temperature, pressure, hydrogen recycling rate, hourly volume velocity, must be adapted to the nature of the charge, mainly characterized by the range of boiling points, the content of aromatics or polyaromatics, the content of heteroatoms. The nitrogen content generally ranges from 5 to 2000 ppm and the sulfur content from 50 to 30 000 ppm.

The temperature is generally higher than 230° C. and often ranges from 300° to 430° C. The pressure is higher than 15 bars and generally higher than 30 bars. The hydrogen recycling rate is at least 100 and often from 260 to 3000 liters of hyrogen per liter of charge. The hourly volume velocity is generally from 0.2 to 10.

The hydrocracking reactions in the presence of such catalysts are illustrated in examples 14 to 17.

EXAMPLE 1

Preparation of a Decationized, Dealuminated and Stabilized Zeolite of L Type, Having a $SiO_2/Al_2O_3$ Ratio of 15

The zeolite of L type is a zeolite call L00, having the molecular chemical composition: 9 K; 9 $AlO_2$; 27 $SiO_2$, containing 14.4% by weight of potassium, produced by Toyo Soda, considered as reference zeolite.

Said zeolite is synthesized in the presence of a small proportion of sodium such that $K^+/(K^+ + Na^+) = 0.98$, $SiO_2/Al_2O_3$ molar ratio=6; a=1.84 nm; c=0.752 nm. Potassium content=14.4% by weight.

100 g of said L00 zeolite is exchanged three times in a 10 N ammonium nitrate solution for 4 h at boiling temperature with a ratio of the solution volume to the weight of solid equal to 4 $cm^3$ $g^{-1}$. After each exchange, the solid is filtered and rinsed. The obtained product is referenced L01 and then contains 3% by weight of potassium. After drying in stove, solid L01 is roasted in dry air (VVH=3 $l \cdot h^{-1} \cdot g^{-1}$) at a temperature of 400° C., to obtain zeolite referenced L02 (temperature increase of 2° C./mn, 2 h-stage at 400° C.). Solid L02 is exchanged three times in the conditions of cation exchange precedingly performed to obtain solid L01. The obtained product, referenced L03, contains no more than 0.4% by weight of potassium.

The characteristics of solids L00, L01 L02 and L03 are reported in table 1.

TABLE 1

| Reference | $\frac{SiO_2}{Al_2O_3}$ moles | K (% b·w) | → a (nm) | → c (nm) | % DX | $N_2$ (% b·w) P/Ps = 0.19 | $C_6H_6$ (% b·w) P/Ps = 0.25 |
|---|---|---|---|---|---|---|---|
| L00 | 6 | 14.4 | 1.836 | 0.752 | 100 | 11.4 | 8.4 |
| L01 | 6 | 3.0 | 1.844 | 0.754 | 105 | nd | 8.8 |
| L02 | 6 | 3.0 | 1.826 | 0.753 | 97 | nd | ≧8.8 |
| L03 | 6 | 0.4 | 1.835 | 0.752 | 102 | nd | ≧8.9 | nd: not determined 0.6 N HCl
V/P = 10 cm³/g (V/P = volume of the exchange solution per weight of solid),
T = 80° C.
operating time of 4 hours under stirring.

Table 2 gives the physicochemical characteristics of the obtained different solids.

TABLE 2

| Reference | $\frac{SiO_2}{Al_2O_2}$ moles | K (% b·w) | → a (nm) | → c (nm) | % DX | $N_2$ (% b·w) P/Ps = 0.19 | $C_6H_6$ (% b·w) P/Ps = 0.25 |
|---|---|---|---|---|---|---|---|
| L04 | 6 | 0.4 | 1.795 | 0.752 | 95 | 5.2 | |
| L05 | 15 | 0.25 | 1.794 | 0.752 | 89 | 16.2 | 12.6 |
| L06 | 6 | 0.4 | 1.796 | 0.752 | 96 | 4.8 | |
| L07 | 15 | 0.25 | 1.795 | 0.752 | 87 | 15.9 | 12.9 |

Thus, as shown by the measured values of X-ray diffraction, of $N_2$ and $C_6H_6$ adsorption, the obtained solid L03 is a strongly decationized L zeolite whose crystalline structure is undamaged.

Solid L03 is subjected to two successive treatments: self-steaming or roasting under steam and then an acid etching. The reference of the solids are indicated in the following diagram:

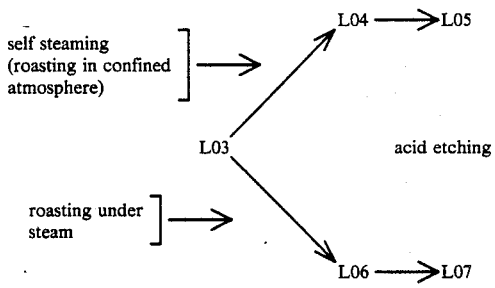

The operating conditions of the various treatments are detailed hereinafter:

Self-steaming: (roasting in confined atmosphere, i.e. without any external gas flow, the steam necessary to the treatment being supplied by the product itself).

Solid L03, previously charged into a quartz reactor, is placed into a furnace heated to 650° C. The treatment is performed under static atmosphere for 4 hours.

Roasting under steam:
rate of temperature increase: 10° C. mn⁻¹,
air flow rate 3 l h⁻¹g⁻¹,
water supply at 400° C. at a rate of 2.25 cm³ h⁻¹g⁻¹ of liquid water corresponding to a molar steam content of 50%,
final temperature of 650° C. and 4-hour stage at said temperature,
decrease to room temperature, flow rate of 6 l h⁻¹g⁻¹.
Acid etching:

The X-ray diffraction results show that solids L04, L05, L06 and L07 are well crystallized. After roasting in the presence of steam, solids L04 and L06 have a small nitrogen and benzene adsorption capacity as a result of the presence in the pores of aluminum specie, extracted from the frame by effect of steam at high temperature.

The removal of all or a part of these aluminum specie extra lattice by the acid ethching effect makes it possible to restore the adsorption capacities of the solids without affecting the crystanility measured by X-ray diffraction. Solids L05 and L07 have a lattice of secondary pores generated during the modifying treatments. The radii of these secondary pores are centered about 3 nm with a distribution in the range of 1.5-20 nm. The volume of secondary pores, in proportion to the total pore volume, is 29%.

The decationized and dealuminated zeolites L05 and L07 are characterized by a clearly improved thermal stability as compared with the starting solid. After roasting under a dry air stream of 10 l h⁻¹g⁻¹ at 900° C. for 4 hours, the DX crystallinity rates for L05 and L07 are respectively 70 and 75%, whereas this type of treatment results in a substantially complete destruction of non stabilized solids (L00, L01, L02, L03). The obtained highly decationized solids have a $SiO_2/Al_2O_3$ ratio which is more than twice that of the initial solid and their thermal stability is considerably improved.

EXAMPLE 2

Preparation of a Decationized, Dealuminated and Stabilized Zeolite Having a $SiO_2/Al_2O_3$ Ratio of 30

The $SiO_2/Al_2O_3$ ratio L zeolite may be varied within a wide range by modifying the temperature and/or the steam content of the thermal treatments and/or the strength of the acid etching.

The operating conditions are identical to those of example 1 with roasting under steam, except that roasting is performed at 730° C. and the acid etching has been conducted with a 1.8 N HCl solution at 100° C. The solid obtained after etching is referenced L09.

Table 3 hereinafter gives the physicochemical characteristics of the obtained solids.

TABLE 3

| REFERENCE | $\frac{SiO_2}{Al_2O_3}$ moles | K (% b · w) | → a (nm) | → c (nm) | % DX | $N_2$ (% b · w) P/Ps = 0.19 | $C_6H_6$ (% b · w) P/Ps = 0.25 |
|---|---|---|---|---|---|---|---|
| L09 | 30 | <0.2 | 1.793 | 0.752 | 91 | 16.5 | 12.1 |

As precedingly, the DX crystallinity of the solid remains very good. By way of example, the X-ray diffraction spectrum characteristics of L09 are detailed in table 4. L09 solid is characterized by a lattice of secondary pores of radii centered about a value of 3.2 nm and whose distribution is in the range of 1.5–20 nm. The volume of secondary pores, in proportion to the total pore volume, is 54%.

The thermal stability of L09, as that of L05 and L07, remains excellent since this solid keeps a DX crystallinity higher than 77% after roasting in dry air (15 l $h^{-1}g^{-1}$) at 900° C. for 4 hours.

TABLE 4
Characteristics of L09 X-ray diffraction diagram.

| I/I$_o$ | 2 θ | d(Å) |
|---|---|---|
| 100 | 5.69 | 15.53 |
| 25 | 9.86 | 8.97 |
| 12 | 11.71 | 7.56 |
| 21 | 13.03 | 6.79 |
| 62 | 15.09 | 5.87 |
| 52 | 15.33 | 5.78 |
| 37 | 16.37 | 5.41 |
| 13 | 17.13 | 5.18 |
| 43 | 19.80 | 4.48 |
| 28 | { 22.90 | { 3.88 |
|    |   23.06 |   3.86 |
| 31 | 24.24 | 3.67 |
| 23 | 25.58 | 3.48 |
| 36 | 26.23 | 3.40 |
| 20 | 27.68 | 3.22 |
| 33 | 28.74 | 3.11 |
| 19 | 29.26 | 3.05 |
| 20 | 29.89 | 2.99 |
| 18 | 30.95 | 2.89 |
| 10 | 32.73 | 2.74 |
| 10 | 34.26 | 2.62 |
| 9  | 34.65 | 2.59 |
| 9  | 35.64 | 2.52 |

EXAMPLE 3

Preparation of a Decationized, Dealuminated and Stabilized L Zeolite Having a SiO$_2$/Al$_2$O$_3$ Ratio of 82

High SiO$_2$/Al$_2$O$_3$ ratios may be obtained by two ways: either by increasing the severity of treatment under steam or by subjecting the solid to roasting-acid etching cycles.

This example illustrates the second way. The starting solid is L07 of Example 1. It is successively subjected to the following treatments:

self steaming at 750° C. for 4 hours,
acid etching in 3N HCl with a V/P ratio of 10 cm$^3$ g$^{-1}$, at 100° C. for 4 hours under stirring.

The solid obtained after acid etching is referenced L11. Its physicochemical characteristics are summarized in table 5.

TABLE 5

| REFERENCE | $\frac{SiO_2}{Al_2O_3}$ moles | K (% b · w) | → a (nm) | → c (nm) | % DX | $N_2$ (% b · w) P/Ps = 0.19 | $C_6H_6$ (% b · w) P/Ps = 0.25 |
|---|---|---|---|---|---|---|---|
| L11 | 82 | <0.15 | 1.790 | 0.752 | 90 | 17.8 | 13.0 |

Like the decationized, dealuminated, stabilized solids L05, L07, L09, product L11 is characterized by a lattice of secondary pores whose radii are centered about a value of 3 nm. The thermal stability of L11 is similar to or better than that of the solids obtained in examples 1 and 2. After roasting in dry air at 900° C. (10 l h$^{-1}$g$^{-1}$) for 4 hours, the DX crystallinity of L11 is still equal to 75%. The volume of the secondary pores, in proportion to the total pore volume, is 63%.

EXAMPLE 4

Preparation of a Decationized, Dealuminated and Stabilized Zeolite of L Type Having a SiO$_2$/Al$_2$O$_3$ Ratio of 200

As in example 3, steam roasting-acid etching cycles are performed.

The starting solid is L11, prepared according to example 3, subjected to cation exchange with a 10 N ammonium nitrate solution in the conditions defined in example 1, giving a solid referenced L12.

Solid L12 is subjected to self-steaming at 800° C., then to acid etching in the following conditions:

5N HCl,
V/P=15 cm$^3$/g
T=100° C.,
operating time of 4 hours under stirring.

The solid obtained at the end of these treatments is referenced L14. Its physicochemical characteristics are reported in table 6.

TABLE 6

| REFERENCE | $\frac{SiO_2}{Al_2O_3}$ moles | K (% b · w) | → a (nm) | → c (nm) | % DX | $N_2$ (% b · w) P/Ps = 0.19 | $C_6H_6$ (% b · w) P/Ps = 0.25 |
|---|---|---|---|---|---|---|---|
| L14 | 200 | <0.10 | 1.788 | 0.751 | 85 | 18.3 | 12.8 |

The DX crystallinity and the nitrogen and benzene adsorption capacities of solid L14 are very good. Its secondary pore lattice has radii still centered about a 3 nm value, with a wide distribution range from 1.5 to 20 nm. The thermal stability of this solid is excellent since, after roasting at 950° C. under dry air (15 l h$^{-1}$g$^{-1}$) for 4 hours, the crystallinity rate is 77%.

EXAMPLE 5

Preparation of a Decationized, Dealuminated and Stabilized Zeolite of L Type Having a $SiO_2/Al_2O_3$ Ratio of 25

As explained above, the cation exchange steps for preparing a L zeolite of low potassium content may be conducted in solutions of ionizable ammonium salt and-/or in inorganic or organic acid solutions of low concentration. This example illustrates the second possibility.

The starting solid is L02 zeolite, whose preparation and physicochemical characteristics have been described in table 1 of example 1.

For removing a portion of the 3% residual potassium cations, the second series of ion exchanges, after roasting in dry air at 400° C., is performed in 0.01 N hydrochloric acid solutions in the following conditions:

0.01 N HCl,
V/P=20
T=50° C. (room temperature)
operating time of 4 hours with stirring.

After a series of 5 cation exchanges, the potassium content 0.6%. The obtained solid is referenced L15.

This zeolite is then subjected to self steaming at 690° C. and to acid etching in the conditions defined in example 1. The resultant solid, after acid etching, is referenced L17. Its physicochemical characteristics are reported in table 7.

TABLE 7

| REFERENCE | $\frac{SiO_2}{Al_2O_3}$ moles | K (% b·w) | → a (nm) | → c (nm) | % DX | $N_2$ (% b·w) P/Ps = 0.19 | $C_6H_6$ (% b·w) P/Ps = 0.25 |
|---|---|---|---|---|---|---|---|
| L15 | 6 | 0.6 | 1.825 | 0.752 | 91 | 16.5 | 10.0 |
| L17 | 25 | 0.4 | 1.793 | 0.752 | 89 | 16.0 | 12.0 |

EXAMPLE 6

Preparation of a Decationized, Dealuminated and Stabilized Zeolite of L Type Having a $SiO_2/Al_2O_3$ Ratio of 42

A decationized L zeolite having a low potassium content may be obtained without impairing the solid crystallinity, by using one or more cycles of ion exchanges-roasting in dry air-ion exchanges, and/or by only ion exchanges in solutions of organic or inorganic acid of concentration lower than 0.1 N. This example illustrates the second possibility.

The potassium of a Toyo Soda L zeolite is decreased to 0.7% by a series of 9 ion exchanges in a hydrochloric acid solution, under the following conditions:

0.01 N HCl,
V/P=50,
T=30° C.,
operating time of 4 hours with stirring.

This highly decationized solid, referenced L 18, is then dealuminated and stabilized by a treatment similar to those used in the preceding examples: self steaming at 770° C. for 4 hours, and then acid etching in a 3 N hydrochloric acid solution (V/P=10, T=100° C., t=4 hours); the solids obtained after self steaming and acid etching are respectively referenced L19 and L20. The physicochemical characteristics of the obtained solids are reported in table 8.

TABLE 8

| REFERENCE | $\frac{SiO_2}{Al_2O_3}$ moles | K (% b·w) | → a (nm) | → c (nm) | % DX | $N_2$ (% b·w) P/Ps = 0.19 | $C_6H_6$ (% b·w) P/Ps = 0.25 |
|---|---|---|---|---|---|---|---|
| L18 | 6 | 0.7 | 1.819 | 0.753 | 87 | 13 | 11.9 |
| L19 | 6 | 0.7 | 1.791 | 0.755 | 85 | 4 | ND |
| L20 | 42 | 0.2 | 1.791 | 0.752 | 80 | 15.3 | 12.8 |

Product L20 is characterized by a lattice of secondary pores and a thermal stability quite similar to those of L09 of example 2.

EXAMPLE 7 (Comparative)

Importance of the Operating Conditions in the Intermediary Roasting Step (Step 2) Performed During the Decationization of L Zeolite This example shows that the intermediary roasting of the solid required for an extensive decationization must be preferably conducted in the absence of steam or in the presence of very small steam amounts. Solid L01, prepared in example 1 and which contains 3% of potassium, is roasted at 450° C. in the following conditions:

rate of temperature increase: 2° C./mn
air flow rate: 1.5 l h$^{-1}$g$^{-1}$
2 hour-stage at 450° C.,
water supply during the stage at 450° C. at such a rate that the steam content is 50%.

The obtained solid is referenced L21. It is exchanged three times in a 10 N ammonium nitrate solution. The resultant solid, called L22, contains 0.8% by weight of potassium. It is self steamed at 750° C. (L23), then subjected to etching with 3 N acid (L24).

It is observed that the resultant solid (L24) not only keeps a low molar $SiO_2/Al_2O_3$ ratio (about 20) but is destroyed as far as its DX crystallinity is concerned (20%).

EXAMPLE 8 (Comparative)

Ineffectiveness of Direct Acid Etching of L Zeolite for Preparing a Decationized, Dealuminated and Stabilized solid (Fifth Step Directly Performed)

This example illustrates the fact that a direct acid etching provides a decationized, dealuminated but non stabilized solid.

Two samples of hereinafter defined L zeolite are subjected to acid etching in the following conditions: 1N HCl, temperature of 100° C. and ratio of solution volume to zeolite weight equal to 5 cm$^3$·g$^{-1}$. These two samples are respectively raw synthetic L00 zeolite, containing 14.4% by weight of potassium, and L01 solid of example 1, containing 3.0% by weight of potassium.

The solids obtained at the end of this treatment are respectively referenced L25 and L26.

As shown by the physicochemical data of table 9, the DX crystallinity of these two solids is destroyed.

TABLE 9

| REFERENCE | $\frac{SiO_2}{Al_2O_2}$ mole | K % | DX % |
|---|---|---|---|
| L25 | 45 | 1.8 | 13 |
| L26 | 52 | 1.3 | 10 |

EXAMPLE 9

Preparation of a Dealuminated L Zeolite Having a $SiO_2/Al_2O_3$ Ratio of 15, Retroexchanged with Rare Earths In a first step, a dealuminated, stabilized L zeolite of $SiO_2/Al_2O_3$ ratio equal to 30 is prepared in conformity with example 2. The obtained L zeolite has the physicochemical characteristics of L09 (example 2).

100 g of L09 zeolite are subjected to exchange in 1000 cm³ of rare-earth solution having a 0.15N rare-earth molarity. The exchange is performed at 100° C. for 4 hours. During the exchange, the pH is controlled and maintained within the range of 5–5.5. The composition of the rare-earth mixture used for the exchange is as follows, by weight:

$La_2O_3 = 57\%$ by weight
$CeO_2 = 15\%$ by weight
$Nd_2O_3 = 21\%$ by weight
$Pr_6O_{11} = 7\%$ by weight.

At the end of the exchange, a dealuminated L zeolite containing rare-earths, at a total concentration of 4.5%, expressed as rare-earth oxides, is obtained. The so-exchanged solid has still the $SiO_2/Al_2O_3$ ratio of L09 as well as the X-ray diffraction spectrum of L zeolite. It is referenced L09 R.

EXAMPLE 10

Hydrothermal Ageing Test and Measurement of the Catalytic Performances in a Micro-Unit The various zeolites obtained in examples 1 to 4 are pelletized and then reduced to small aggregates by means of a crushing machine. The fraction of size ranging from 40 to 200 microns is then recovered by screening.

Each of the obtained powders is subjected to the following hydrothermal treatment: 8 hours at 750° C. under a steam partial pressure of 1 bar.

After this treatment, the crystalline parameters of the various samples have changed. Their new values are reported in table 9.

The purpose of this example is merely to simulate an industrial ageing on a fresh zeolite. L04 zeolite is used by way of comparative example.

TABLE 9

Crystalline parameters of various zeolites after hydrothermal treatment.

| Type of zeolite forming part of the catalyst composition. | L04 | L05 | L09 | L11 | L09R |
|---|---|---|---|---|---|
| $a_{nm}$ | 1.792 | 1.791 | 1.791 | 1.790 | 1.793 |
| $c_{nm}$ | 0.752 | 0.752 | 0.752 | 0.751 | 0.752 |
| nitrogen adsorption P/Ps = 0.19 | 2.5 | 6.5 | 15.0 | 17.1 | 14.0 |

5 cracking catalysts have been prepared from aged samples obtained according to example 5, by diluting zeolites in a proportion of 20% by weight in amorphous silica of controlled granulometry similar to that of the zeolites. 4 g of each of said catalysts are introduced into the reactor of a test micro-unit MAT. The capacity of each catalyst to convert a vacuum distillate (VC) is then determined in the following conditions:

amount of treated charge: 1.3 g
C/O=3 (C/O is the ratio of the catalyst weight to the weight of the feed charge)
time of introduction of the 1.3 g charge amount = 75 seconds
weight hourly space velocity (WHSV) = 15 h⁻¹
temperature: T=480° C.

The feed charge (VD) has the following characteristics:

density at 15° C. = 0.904
S% by weight = 1.3
N% by weight < 0.1
conradson carbon % = 0.32
Ni+V (ppm) < 1

| Distillation (ASTM D 1160) | IP = 202° C. |
|---|---|
| | 10% = 307° C. |
| | 50% = 402° C. |
| | 90% = 510° C. |
| | FP = 585° C. |

Comparison of the Catalytic Performances

The results are expressed as follows:
conversion of the charge in % by weight
gas yield ($H_2 + C_1 - C_4$ hydrocarbons)
$C_5$-220° C. gasoline yield
coke Table 10 gives these performances for 6 catalysts.

TABLE 10

Results of MAT tests.

| CATALYTIC PERFORMANCES | CATALYSTS | | | | |
|---|---|---|---|---|---|
| | L04 | L05 | L09 | L11 | L09R |
| Conversion % b.w | 19.7 | 30.3 | 53.1 | 51.5 | 57.7 |
| Gas ($H_2 + C_1 - C_4$) | 5.1 | 7.5 | 13.4 | 13.0 | 14.4 |
| $C_5$-210° C. gasoline | 12.8 | 20.0 | 35.6 | 34.7 | 38.2 |
| Coke | 1.8 | 2.8 | 4.1 | 3.8 | 5.1 |

EXAMPLE 11

Preparation of a Catalyst A and of a Catalyst A'. The object is to Prepare a Decationized, Dealuminated and Stabilized L Zeolite Having a $SiO_2/Al_2O_3$ Ratio of 15

Catalysts A et B are prepared from products L05 and L07 obtained in example 1.

Dry products L05 and L07 are impregnated with platinum according to the conventional cation exchange technique, with competition. Tretrammine platinum chloride Pt(NH₃)₄Cl₂ is used with ammonium nitrate as competitor. Each of the obtained catalysts A and A' (respectively from L05 and L07) contains 0.4% by weight of platinum. They are charged, in two separate experiments, into a catalytic unit with fixed bed where they are first reduced under hydrogen at 450° C. Their performances are given in table I. The obtained conversion rates and selectivities are higher than those obtained with a conventional catalyst prepared as indicated below in example 12.

EXAMPLE 12

Preparation of a Catalyst B (Comparison)

The raw material is a small-pore mordenite referenced Alite 150 manufactured by Société Chimique de la Grande Paroisse. Its chemical formula in anhydrous state is: Na $AlO_2(SiO_2)_{5.5}$ and its benzene adsorption capacity is 1% by weight in proportion to the weight of dry solid (mesh volume of 2.79 nm$^3$; sodium content of 5.3% by weight), kinetic diameter of the adsorbed molecules: 3.8Å; 50 g of said power are dipped into a 2 M ammonium nitrate solution and the suspension is brought to 95° C. for 2 hours.

The volume of involved ammonium nitrate solution is equal to 4 times the dry zeolite weight (V/P=4). This cation exchange operation is renewed three times. After the third exchange, the product is washed with water at 20° C. for 20 mn with a V/P ratio equal to 4. The sodium content, expressed in percent by weight with respect to the dry weight, decreases from 5.5 to 0.1%. The product is then filtered and subjected to roasting in confined atmosphere at 600° C. for 2 hours.

Then, an acid etching is performed with 0.58 N hydrochloric acid by bringing the product to reflux in a hydrochloric acid aqueous solution at 90° C. for 2 hours, with a V/P ratio equal to 8. The product is then filtered, washed with 0.1 N hydrochloric acid and then with water.

The Si/Al atomic ratio of said mordenite is equal to 12, its mesh volume is 2.750 nm$^3$, its sodium content 300 ppm and its benzene adsorption capacity 9.6% by weight with respect to the dry solid weight. This mordenite has a morphology of needles of 5 microns average length with hexagonal faces of about 1 micron length and about 0.3 micron height. This modified mordenite is then mixed with a binder of the bentonite or alumina type and then this mixture, containing 25% by weight of binder, is forced through a drawing plate. The extrudates, of 1.2 mm diameter, are then dried and roasted.

0.4% of platinum are then deposited onto this carrier by cation exchange from tetrammine platinum chloride $Pt(NH_3)_4Cl_2$, with ammonium nitrate as competing ion.

The sodium amount of the final catalyst is 80 ppm. The Si/Al atomic ratio is equal to 12 and the mesh volume to 2.750 nm$^3$. The extrudates are then dried and roasted at 500° C.

The obtained catalyst is charged into a catalytic unit with fixed bed and reduced under hydrogen at 450° C.

EXAMPLE 13

In this example, the catalysts are tested with a n-hexane charge in the following conditions: temperature of 250° C., pressure of 30 bars, n-hexane weight per weight unit of catalyst and per hour: 2, hydrogen to n-hexane molar ratio: 2. The performances indicated in table 11 are obtained after 30 hours of catalyst running conditions.

TABLE 11

| CATALYST | CONVERSION | SELECTIVITY |
|---|---|---|
| A' | 80.0 | 98.6 |
| A | 79.9 | 98.5 |
| B | 79.5 | 98.3 |

The performances are expressed in term of n-hexane conversion and of isomerization selectivity and defined as follows:

$$\text{Conversion} = \frac{\text{n-hexane input weight} - \text{n-hexane output weight} \times 100}{\text{n-hexane input weight}}$$

$$\text{Selectivity} = \frac{\Sigma \text{ (Weight of isomers)} \times 100}{\Sigma \text{ (Weight of reaction products)}}$$

EXAMPLE 14

Preparation of Zeolites

Zeolites L01, L03, L05 and S have been prepared from a raw material consisting of a zeolite described in example 1.

Products L01, L02 and L03 have been prepared as indicated in example 1.

As in example 1, solid L03 is subjected to a thermal treatment in confined atmosphere (self-steaming), then to acid etching. The references of the solids are stated again on the following diagram:

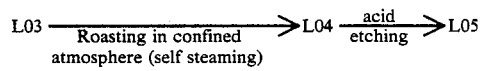

The operating conditions of the two treatments are those specified in example 1.

The silica/alumina molar ratio of said product, called zeolite L05, increased from 6 to 15, and the potassium content is 0.25%. The nitrogen adsorption values show that the structure of the zeolite is kept perfectly unchanged.

Table 12 reports again the physicochemical characteristics of the obtained different solids.

TABLE 12

| REFERENCE | $\frac{SiO_2}{Al_2O_3}$ moles | K (% b · w) | → a (nm) | → c (nm) | % DX | $N_2$ (% b · w) P/Ps = 0.19 | $C_6H_6$ (% b · w) P/Ps = 0.25 |
|---|---|---|---|---|---|---|---|
| L04 | 6 | 0.4 | 1.795 | 0.752 | 95 | 5.2 | |
| L05 | 15 | 0.25 | 1.794 | 0.752 | 89 | 16.2 | 12.6 |
| S | 39 | 0.06 | 1.704 | 0.752 | 88 | 16.3 | 12.7 |

The X-ray diffraction results show that solids L04 and L05 are well crystallized. After roasting in the presence of steam, solid L04 has a low nitrogen and benzene adsorption capacity due to the presence in the pores of aluminum specie extracted from the frame by the effect of steam at high temperature.

A still more strongly dealuminated zeolite S is prepared. It is obtained from zeolite L05 by thermal treatment in confined atmosphere at 650° C. for 4 hours, followed with an acid treatment by 2N HCl at reflux for 4 hours. The silica-to-alumina molar ratio is 39, the potassium content 0.06%; the product is still well crystallized as it appears from the X-ray diffraction spectrum and from nitrogen adsorption capacity.

The characteristics of S zeolite are also given in table 12.

The removal of all or a part of the aluminum specie extra lattice by acid etching effect makes it possible to restore the adsorption capacities of the solids without affecting the crystallinity measured by X-ray diffraction. Solids L05 and S have a lattice of secondary pores, generated during the modifying treatments. The radii of said secondary pores are centered about a value of 3 nm with a distribution in the range of 1.5–20 nm. The volume of the secondary pores, in proportion to the total pore volume, is 29%.

L05 and S decationized and dealuminated zeolites are characterized by a clearly improved thermal stability as compared with the starting solid. After, for example, a roasting performed under a dry air flow of 10 l h$^{-1}$g$^{-1}$ at 900° C. for 4 hours, the DX crystallinity rates for L05 and S are respectively equal to 70 and 74%, whereas this type of treatment leads to the substantially complete destruction of unstabilized solids (L00, L01, L02, L03). Thus, very highly decationized solids are obtained whose $SiO_2/Al_2O_3$ ratio more than doubled as compared to that of the initial solid and whose thermal stability is considerably improved.

EXAMPLE 15

Preparation of Catalysts $C_1$, $C_2$, $C_3$ and $C_4$

The catalysts are prepared as follows: a pseudo-boehmite alumina supplied by CONDEA Company is peptized by addition of nitric acid and then mixed.

Catalysts $C_1$, $C_2$, $C_3$ and $C_4$ are obtained by admixing said pseudo-boehmite respectively with the above-prepared zeolites L01, L03, L05 and S.

Each zeolite is introduced in proportion of 40 g of zeolite per 100 g of alumina and then mixed; the resultant paste, after adjustment of its consistency by addition of small water amounts, is forced through a drawing plate of 1.4 mm diameter, then dried under air stream at 120° C. and roasted at 550° C. for one hour.

After cooling, the catalysts are impregnated in a rotary bowl-granulator by the so-called dry impregnation technique. The impregnating solution contains ammonium paramolybdate, phosphoric acid and nickel nitrate so that, after calcination in air at 500° C., each catalyst contains:
13% of molybdenum oxide $MoO_3$
2,5% of nickel oxide NiO
4% of phosphorus oxide $P_2O_5$

EXAMPLE 16

The performances of catalysts $C_2$ and $C_3$ are appraised in hydrocracking operations and compared with that of catalyst $C_1$.

These catalysts are charged into a test unit, the presulfurized by a gas-oil of the grade used in Diesel engines to which are added 2% by weight of dimethyl disulfide at a temperature of 300° C. and a pressure of 60 bars.

The charge to hydrocrack is a vacuum distillate previously hydrotreated over a bifunctional catalyst formed of nickel and molybdenum and of a silica-alumina carrier. For simulating a hydrocracking process, the residue of said hydrotreated distillate has been used. Its characteristics are as follows:
Distillation Point
5%: 385 (°C.)
50%: 455
95%: 520
S(ppm)=205
N(ppm)=15

In order to conform with the conditions of hydrocracking process with reactors in series, 2.2% by weight of dimethyldisulfide and 0.9% by weight of aniline are added to said charge.

The total pressure is 140 bars and the temperature is set at 380° C.

After a period of 60 hours for reaching steady running conditions, the results, expressed in term of conversion of products of a boiling point lower than 380° C., are as follows:

| CATALYST | CONVERSION % |
|---|---|
| C1 prepared from L01 | 43 |
| C2 prepared from L03 | 72 |
| C3 prepared from L05 | 75 |

The comparison of catalyst C1 (comparative) and $C_2$ makes apparent the advantage resulting from the decrease of the potassium content from 3 to 0.4%. For catalyst $C_3$, slight activity increase is observed in spite of the increase from 6 to 15 of the silica-alumina molar ratio of the zeolite.

EXAMPLE 17

Catalysts C1 (comparative), $C_3$ and $C_4$ have been tested in more severe conditions, i.e. at a lower pressure, to appraise the catalytic stability of the various systems.
The charge is as follows:
5% point: 365 (°C.)
50% point: 443
95% point: 517
S ppm: 350
N ppm: 40

2.4% by weight of dimethyldisulfide and 1% by weight of aniline are added to said charge. The total pressure is 90 bars and the temperature is so adjusted as to obtain a raw conversion rate of 75%. Said temperature is measured after 50 hours (T1) and also after 350 hours (T2) in order to appraise the deactivation of the catalytic system.

The results are as follows:

| CATALYST | T1 (°C.) | T2 (°C.) |
|---|---|---|
| C1 prepared from L01 | 405 | 415 |
| C3 prepared from L05 | 390 | 394 |
| C4 prepared from S | 395 | 397 |

Catalyst C1, used as reference (comparative), has a low activity and a high unstability in these operating conditions.

Catalyst $C_4$ is slightly less active than catalyst $C_3$, likely as a result of the fact that zeolite S is more dealuminated than zeolite L05. Catalyst $C_4$ is however more stable since the loss of activity after 350 hours is only 2° C. as compared with 4° C. for catalyst $C_3$.

What is claimed as the invention is:
1. A catalyst containing by weight:

(a) about 20–98% of a matrix selected from the group consisting of at least alumina, silica-alumina, alumina-boron oxide, magnesia, silica-magnesia, zirconia, titanium oxide, clay, (b) about 2–80% of a L zeolite having a total $SiO_2/Al_2O_3$ molar ratio at least equal to 8, a potassium content lower than 2.9% by weight, a sodium content lower than 0.5% by weight, crystalline parameters a and c respectively lower than 1.836 nm and 0.754 nm, a nitrogen adsorption capacity, measured at 77 K under a P/Ps partial pressure of 0.19, higher than 11% by weight, a benzene adsorption capacity, determined at 30° C. under a P/Ps partial pressure of 0.25, higher than 8.5% by weight, said L zeolite having a lattice of secondary pores (mesopores) of radii ranging from 0.8 nm to 20 nm, the volume of the secondary pores amounting to 5–70% of the total pore volume.

(c) at least one metal or compound of metal selected from the group consisting of the noble or non noble metals from group VIII of the periodic classification of the elements, the concentration of the one or more noble metals from group VIII, expressed as weight of said metal(s), ranging from 0.01 to 5%, the concentration of the one or more non noble metal(s) from group VIII, expressed as weight of said metal(s), ranging from 0.01 to 15%.

2. A catalyst according to claim 1, containing by weight:

(a) about 50–95% of a matrix selected from the group consisting of at least alumina, silica, silica-alumina, alumina-boron oxide, magnesia, silica-magnesia, zirconia, titanium oxide, clay, (b) about 3–50% of a L zeolite having a total $SiO_2/Al_2O_3$ ratio of at least 12, a potassium content lower than 0.7% by weight, a sodium content lower than 0.5% by weight, crystalline parameters a and c respectively lower than 1.815 nm and 0.752 nm, a nitrogen adsorption capacity measured at 77 K under a P/Ps partial pressure of 0.19, higher than 14% by weight, a benzene adsorption capacity, determined at 30° C. under a P/Ps partial pressure of 0.25, higher than 11% by weight, said L zeolite having a lattice of secondary pores (mesopores) of radii ranging from 1.5 nm to 20 nm, optionally from 2.5 nm to 6 nm, the volume of the secondary pores amounting to 20–70% of the total pore volume.

(c) at least one metal or compound of metal selected from the group consisting of the noble or non noble metals from group VIII of the periodic classification of elements, the concentration of the one or more noble metal(s) from group VIII, expressed as the weight of said metal(s), ranging from 0.03 to 3%, the concentration of the one or more non noble metal(s) from group VIII, expressed as the weight of said metal(s), ranging from 0.05 to 10%.

3. A catalyst according to claim 1, wherein the $SiO_2/Al_2O_3$ molar ratio of L zeolite is higher than 100.

4. A catalyst according to claim 1, wherein the DX crystallinity rate of the zeolite is higher than 60%.

5. A catalyst according to claim 4, wherein the DX crystallinity rate of the zeolite is higher than 80%.

6. A catalyst according to claim 1, the L zeolite component having been produced from a L zeolite of $SiO_2/Al_2O_3$ molar ratio generally ranging from 5 to 7, whose $K^+/(K^+ + Na^+)$ molar ratio generally ranges from 1 to 0.3 and whose crystalline parameters a and c are respectively equal to $1.84 \pm 0.004$ and $0.752 \pm 0.003$ nm, by the steps of:

(a) reducing the potassium content to a value lower than 6% by weight, either by at least one ion exchange, between 0° and 150° C., in a solution of ionizable ammonium salt of normality in the range from 0.1 N to saturation, or by at least one treatment between 0° and 150° C. in a solution of inorganic or organic acid of normality lower than 1 N.

(b) roasting in air or inert gas containing less than 15% of steam, the product obtained in the preceding step, for at least 20 minutes at a temperature lower than 800° C.

(c) treating the product obtained in the preceding step between 0° and 150° C.:

either with a solution of ionizable ammonium salt of normality ranging from 0.1 N to saturation, or with a solution of inorganic or organic acid of normality lower than 10 N, so as to decrease the potassium content to less than 2.9% by weight.

(d) subjecting the product obtained in the preceding step:

either to roasting in a gas (essentially formed of air or inert gas) containing 5–100% by volume of steam, or to roasting in confined atmosphere (self-steaming).

(e) subjecting the product obtained in the preceding step, for at least 20 minutes, to at least one etching in a solution of inorganic or organic acid, between 0° and 150° C., the acid solution having a normality from 0.05 to 10 N.

7. In a catalytic hydrocarbon hydrocracking process, the improvement which comprises employing as the catalyst, the catalyst composition of claim 1.

8. A process according to claim 7, wherein the charge is fed to a reaction zone at a temperature from 80° to 400° C., under a relative pressure of 0.7 to 3.5 bars, and wherein the regenerated catalyst is introduced in said reaction zone at a temperature from 600° to 950° C.

9. A process according to claim 7, wherein the charge is a heavy oil cut.

10. A process according to claim 8, wherein the charge is a heavy oil cut.

* * * * *